United States Patent [19]

Ledet

[11] Patent Number: 5,253,748
[45] Date of Patent: Oct. 19, 1993

[54] MODULAR CONVEYOR BELT SEALED SPROCKET DRIVE SYSTEM

[75] Inventor: Brent A. Ledet, Metairie, La.

[73] Assignee: The Laitram Corporation, Harahan, La.

[21] Appl. No.: 963,681

[22] Filed: Oct. 28, 1992

[51] Int. Cl.⁵ .............................. B65G 23/06
[52] U.S. Cl. .................................... 198/834
[58] Field of Search ........................ 198/834

[56] References Cited

U.S. PATENT DOCUMENTS

| | | |
|---|---|---|
| 3,064,797 | 11/1962 | Besel et al. |
| 3,724,285 | 4/1973 | Lapeyre . |
| 4,082,180 | 4/1978 | Chung . |
| 4,730,724 | 3/1988 | Poerink . |
| 4,865,183 | 9/1989 | Hodlewsky et al. ......... 198/834 |
| 5,020,656 | 6/1991 | Faulkner ..................... 198/834 |
| 5,156,263 | 10/1992 | Ledet . |
| 5,170,883 | 12/1992 | Ledet et al. ................. 198/834 |

Primary Examiner—Joseph E. Valenza
Attorney, Agent, or Firm—Laurence R. Brown; James T. Cronvich

[57] ABSTRACT

In a modular belt modular drive unit that can be independently mounted along a modular link belt system, a drive shaft comprises a drum having an integral outer circumferential surface with one or more axially oriented keying surface indentations for mounting mating sprocket wheels for moving axially along the shaft in response to dynamic conditions encountered in driving the belt. The belt is tracked in a preferred position along the shaft by means of a tracking sprocket wheel that has a confined degree of axial movement. Thus a circumferential indentation slot on the shaft surface receives the tracking sprocket wheel rotationally on the shaft so that it de-registers with the keying surface and is held axially in the slot. To use the tracking sprocket wheel as a drive wheel rotating with the shaft when disposed in the slot, the tracking wheel is linked to another sprocket wheel in a position axially confined in the slot.

10 Claims, 3 Drawing Sheets

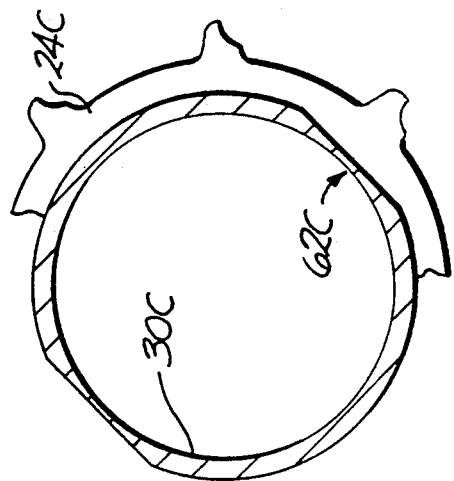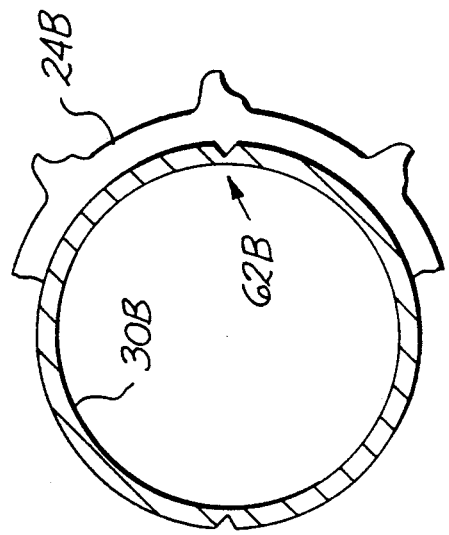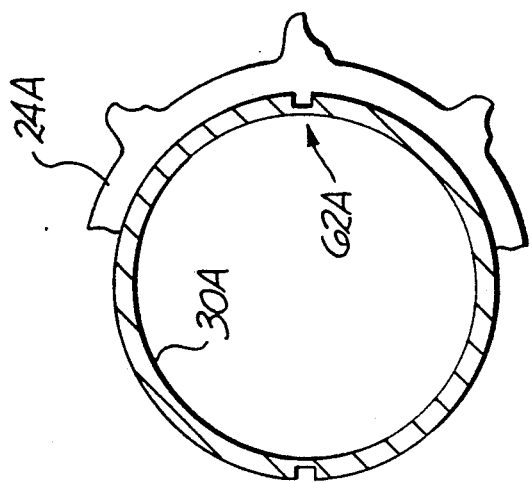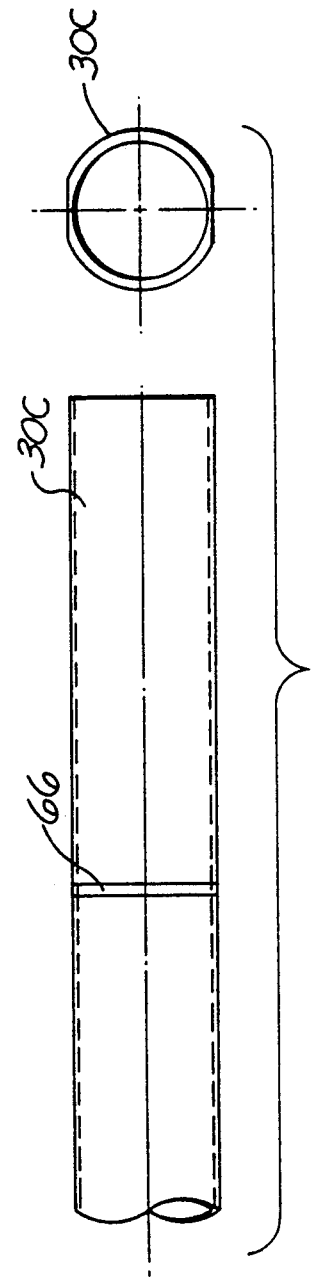

MODULAR CONVEYOR BELT SEALED SPROCKET DRIVE SYSTEM

TECHNICAL FIELD

This invention relates to modular link conveyor belt systems and more particularly it relates to sprocket drive mechanisms therefor.

BACKGROUND

Plastic modular link conveyor belts are ideally suited for processing foods, chemicals and other critical products that must be protected from environmental contamination, such as bacteria, oil or accumulated dust, dirt and grime. In such environments the belt and belt drive systems need to be sanitized or cleaned frequently, and this is difficult and possibly dangerous when the drive system is located inaccessibly. Also, conventional drive systems using sprocket teeth often employ rough surfaces, crevices and corners tending to accumulate contaminants. In such environmental operating conditions, it has been difficult with prior art systems to meet the critical requirements for cleanliness and sanitation because of the presence of sprocket drive teeth and accompanying drive mechanisms in modular link belt drive systems. Consider that because of the mechanical requirements to bear loads and to rotate for long times sprocket gear teeth and accompanying drive mechanisms require lubrication, which encourages vapors and grime inconsistent with sanitation and lack of contamination. Thus, it is a significant problem when contaminants are present, even in trace quantities and where sprockets and drive systems take configurations that tend to breed pockets of contaminants and which are very difficult to reach and clean.

Furthermore sprocket drive systems often employ mechanisms which are subject to excessive wear in the environment of modular link belt operations, where abrasive residue from the belt can significantly shorten operating life.

Additionally safety to operating and service personnel is a problem. However, conventional prior art sprocket drive mechanisms for conveyor belts have drive gears, pulleys and like mechanisms which may not be adequately protected from the possibility of encounter with clothing, tools, loads or even personal body parts such as hands which can be damaged or eyes into which damaging materials could be thrown.

Sprocket drive systems having multiple sprockets across the width of a belt that are rigidly spaced tend to interfere with a modular conveyor belt under conditions of stress, curves and changes of dimensions in mating belt drive socket configurations because of loading or temperature changes. Also as a matter of quality control, it may be difficult to keep modular conveyor belt configurations within very exacting dimensional tolerances that fit fixed sprocket drive wheel spacings. As emphasized when metal drive sprockets engage plastic belt modules, the undesired friction and loading is accompanied by belt wear that significantly reduces belt life.

Furthermore, the location of belt drive sprockets in belt drive systems may not be optimal because of the power drive trains that heretofore have not been compact to fit in various limited space positions. Also it is desirable for optimal system performance to distribute drive power to various belt locations, particularly with longer belts, and the inconvenience of coordinating power drive systems for this purpose has led to compromise in system performance and operating life. Nor have the power drive systems been accessible for maintenance and replacement of defective or worn sprocket wheels and the like, thereby introducing complexity and labor cost for disassembly of portions of the conveyor system to service the power drive portion.

It is therefore an objective of this invention to provide improved sprocket drive systems in modular conveyor belt systems.

Another object of the invention is to provide sprocket drive systems with longer operating life.

Still another object is to provide sprocket drive systems with improved safety to operating and service personnel.

Further it is an object of the invention to produce sprocket to belt drive configurations that are less susceptible to interference when encountering stress and dimensional variations in the conveyor belts.

Another objective of the invention is to provide compact modular drive units that are substantially universally positionable along a conveyor belt system, and adaptable to different belt design and drive sprocket configurations.

Other objects, features and objectives of the invention will be found throughout the following description, drawings and claims.

DISCLOSURE OF THE INVENTION

Substantially all the operating hazards dangerous to personnel are eliminated from the belt drive mechanisms as well as the propensity to accumulate or spread contaminants such as bacteria grease or grime. Thus by closing and sealing in the sprocket drive system mechanism, a conveyor belt system is made more acceptable for environmental control in processing food or chemical products.

Also, operating conditions are improved by compactness of the drive mechanisms into a modular element in accordance with this invention. This reduces friction and packing space, and expedites servicing with simple modular replacement of drive mechanisms with compact modules.

The drive modules are made substantially universal in character by accommodation of various belt sprocket configurations with easily accessible and replaceable sprocket discs. The discs are light weight, thereby reducing power and inertia for better operating conditions, yet sturdy and strong in their assigned duty of driving loaded belts. The discs are further capable of accommodating dynamic stresses of loaded belts under various environmental conditions including curved paths, radical temperature changes and unbalanced loading, by means of free lateral movement transverse to the belt if desired.

All these advantages are achieved by mounting sprocket teeth upon a hollow rotating member internally housing the driving mechanism, typically a substantially cylindrical hermetically sealed drum, which is typically driven by an internally disposed electric motor and drive gear train. The drum when hermetically sealed prevents leakage of oil, vapor or worn off residue into the atmosphere. Likewise it eliminates dirt, dust and abrasives from the drive mechanism thus providing longer life expectations.

Furthermore, this invention by means of electric drive means coaxially coupled to the shaft provides a modular self contained sprocket wheel power drive unit that can be removably disposed across the width of a modular link conveyor belt at various places in a conveyor belt system. This self contained unit is positionable as a module at one or more predetermined locations within the conveyor belt system for ready removal. This feature permits modular system design with location of modular drive units throughout a system, as is particularly advantageous for longer belts and plastic belts where a single laminar metal drive sprocket system may unduly stress modular plastic belt links. Also the modules are significantly advantageous for maintenance and repair, permitting simplified removal for substitution of other modules with very little down time, and/or permitting facilitated repair or maintenance procedures after removal from restricted locations in the belt drive system.

The sprocket teeth are preferably formed on light weight hollow disc like rings mated on the outer rotating drum peripheral surface of the driving module and keyed for rotation with the drum. Shaped drum surfaces, preferably octagonally sculptured, advantageously drive and key the rings for location along the drum axis to mesh with belt drive apertures individually or in sets. Discs are readily provided and positioned to conform to the sprocket drive spacings and teeth configurations for a variety of different belts. The sprocket rings are mountable with at least a degree of free axial movement to accommodate dynamic belt conditions encountered from unbalanced loading, movement around curves and significant temperature changes, thereby increasing belt life and reliability.

In one embodiment, a multiplicity of floating sprocket wheels that conform with changes in belt dimensions across the belt width are rigidly registered with the center of the belt by means of an easily replaceable sprocket wheel retained in a groove at the center of a drive shaft upon which the sprocket wheels are mounted.

Other features and advantages will be evident from the following text.

BRIEF DESCRIPTION OF THE DRAWINGS

In the accompanying drawings, wherein like features are given similar reference characters in the several views to facilitate comparison:

FIGS. 4, 5 and 6 are sketches, partly in section, and partly broken away, looking axially into the drive shaft for different sprocket wheel to shaft coupling configurations which permit the sprocket wheels to move axially along the shaft in a belt driving relationship, FIG. 7 is a sketch of a drive shaft embodiment with a circumferential groove for retaining a sprocket wheel in a fixed axial position along the shaft.

THE PREFERRED EMBODIMENTS

Figure 1:
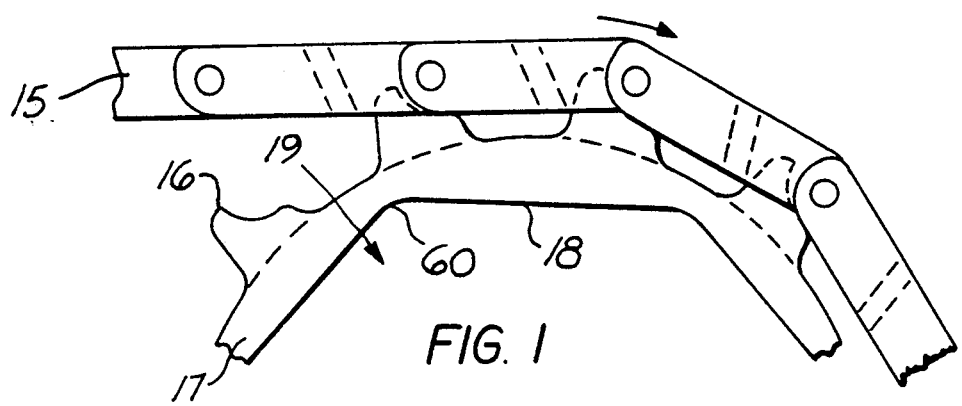
FIG. 1 is a fragmental side view sketch of a modular link conveyor belt sprocket drive system wherein the belt is conveyed by sprocket teeth in the direction of the arrow.

With respect to FIG. 1, it is seen that modular link conveyor belt 15 is driven toward the right by means of sprocket teeth 16 in the rotatable sprocket wheel 17, which may be in the form of a drum, disc or series of spaced discs. This sprocket wheel 17 is keyed on a drive shaft by a non-circular and preferably symmetrical central bore 19, in this embodiment defined as an octagon with flat planar sides 18.

Figure 2:
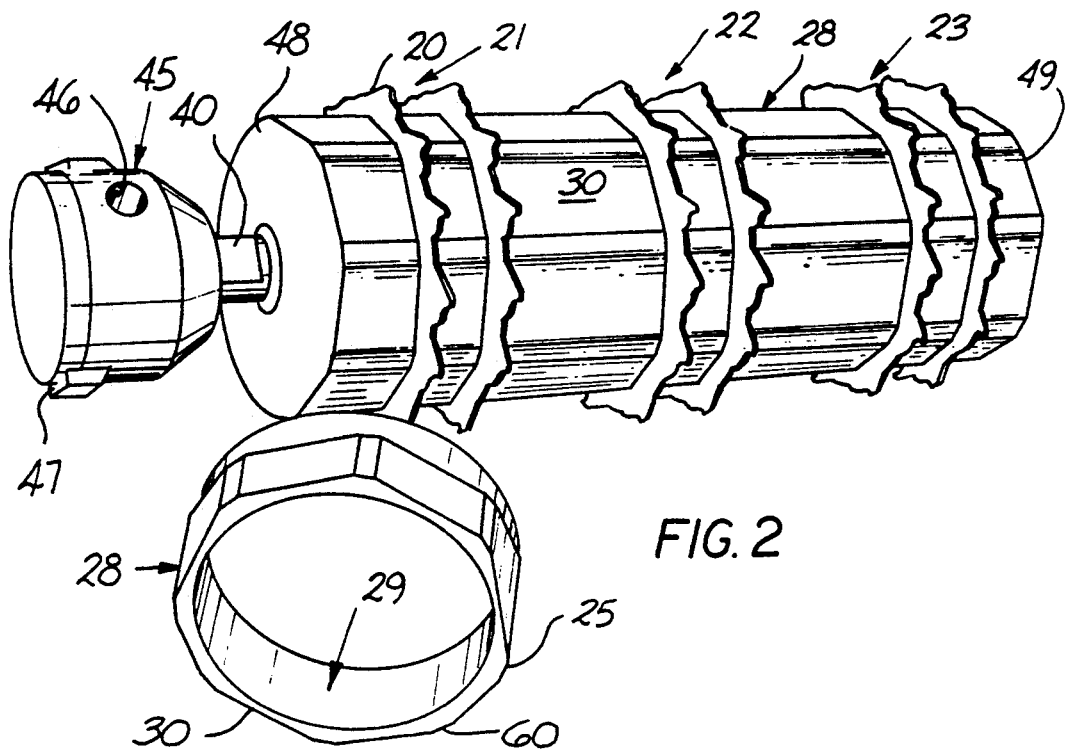
FIG. 2 is a side perspective view of a modular belt sprocket drive mechanism embodiment of the invention, with comparative fragmental cutaway segment emphasizing construction details of the hollow outer drum used in accordance with this invention to carry the sprocket teeth.

As seen in FIG. 2, a series of sprocket discs 20 are arranged in paired sets 21, 22, 23 axially along the outer peripheral surface 25 of a hollow body member 28 in the form of a substantially cylindrical pipe 29 with a smooth cylindrical interior surface in this embodiment. The outer peripheral surface has eight flattened surfaces 30 arranged in octagon configuration for mating with octagon shaped aperture surfaces 18 of the individual sprocket discs 20.

Figure 3:
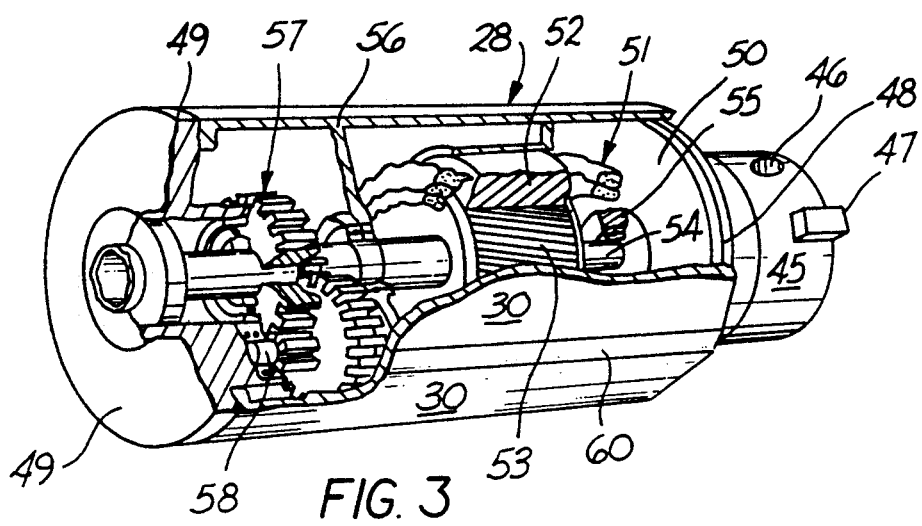
FIG. 3 is a perspective, cut away sketch of a typical motor drive embodiment afforded by this invention.

The discs 20 and disc sets 21, etc. may have sprocket tooth shapes and spacings to mate with various modular belt configurations of various widths. The outer hollow body member 28 as shown in both FIGS. 2 and 3 is rotatable coaxially about a supporting shaft 40, which is anchored to a suitable frame, thus making the externally disposed stationary service compartment 45 accessible for receiving lubricating fluid at port 46 and electrical connections at terminals 47. The hollow member 28 has end plates 48, 49 to form an enclosed drum assembly capable of hermetic sealing to prevent dust and grime or conveyor belt residue from entering into the interior, and for preventing internal grease, grit or vapors from entering the environment in which the conveyor belt is working.

In the drum interior 50, as shown in FIG. 3, is mounted the conveyor belt electrical drive motor 51, coaxially coupled with driveshaft 30. Conventional stator member 52 is mounted on the stationary inner wall 56 and the conventional armature 53 mounted on the rotatable shaft 54 along the axis of the drive shaft 30, and is journalled for rotation in bearing 55. Thus, the motor drives the planetary gear train 57 having individual gears journalled in bearings 58, etc. thereby to rotate the drum end panel 49 and thus the outer hollow drum cylindrical member 28. Variations from this particular electrical motor driven mechanism can be made without departing from this invention. Alternative forms of such mechanisms are known in the art, such as shown in Chung U.S. Pat. No. 4,082,180, Apr. 4, 1978 and Besel, et al. U.S. Pat. No. 3,064,797, Nov. 20, 1962. Also, more than eight sides, say 20 are possible, especially for large diameter sprockets.

Although fewer drum sides 30 could be used, the octagonal configuration including the rounded corners 60 has significant advantage in that the peak to valley ratio of wall thickness is reduced and a thinner, lighter shell is rotatable with less energy. The even number of surfaces is thus symmetrically disposed for good balance. However, if it is desirable to radially key the sprocket discs 20 in a particular position, one such surface (18, 30) may be made asymmetrical by being shorter, longer, or shallower, etc. The thin walls also provide a better dissipation of internal heat from the drive mechanism, which can also be aided by internal lubricant-cooling fluids supplied and monitored at the port 46.

It is evident that the mechanism is easily cleaned and sanitized in the absence of any rough surfaces, crevices and corners that tend to accumulate dirt, grease or grime. The sprocket discs, particularly when freely axially movable can also be easily moved or removed from the drum for cleansing and sanitation. A preferable drum surface material would be anodized aluminum, since it is light weight and non-corrosive, or stainless.

As seen in the respective shaft to sprocket wheel embodiments of FIGS. 4, 5 and 6, the drive key 62 configuration for non-rotatively retaining the sprocket wheel 24 on the shaft 30 while permitting axial movement may have different patterns. The sprocket wheel 24 is a laminar ring member in contact with the outer surface of hollow drive shaft 30. Mating keying structure respectively provided on the rotatable shaft 30 and sprocket wheels 24 assures rotation of sprocket wheels in a driving relationship with a modular link belt conveyor system. The keying structure constitutes axial displacement means for permitting at least a subcombination of the sprocket wheels aligned on the shaft to axially move along the shaft in response to dynamic conditions encountered in driving the belt.

The special shaft configuration 30C as shown in FIG. 7 has an additional feature in that a circumferential groove 66 is provided along the shaft. This, as later explained, is for anchoring the belt drive axis at a predetermined axial location on the shaft 30, to assure proper tracking of the belt so that the belt cannot wander axially off track, even though sprocket wheels 24 are permitted to move axially on the shaft.

Figure 8:
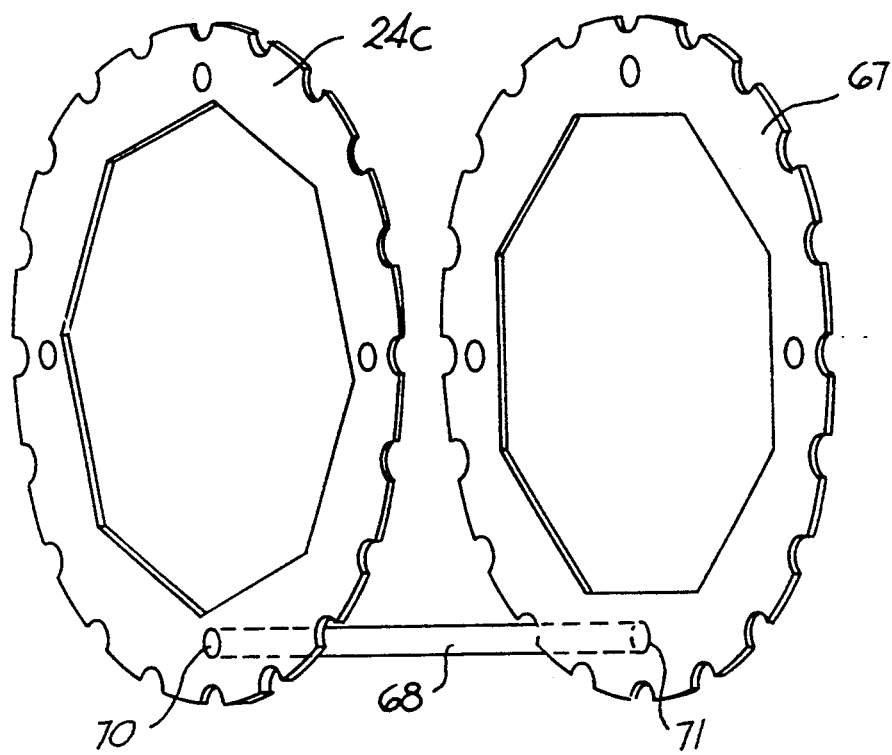
FIGS. 8 and 9 are respective perspective and end views of an assembly of sprocket drive wheels that axially adjust to lateral belt dimensional changes while restraining the belt from drifting in axial position.

By reference to FIGS. 7 and 8, it is seen that if the sprocket wheel 67 is slipped in registration over a keyed shaft, in FIG. 8 of hexagonal configuration, when it reaches the indentation groove 66, it may be rotated without registering the respective key structure on the wheel and shaft, in effect disregistering the shaft and sprocket wheel keys. Thus the sprocket wheel is retained axially in place, when not rotated back into a position to put the shaft and sprocket wheel keys in registry.

Figure 9:
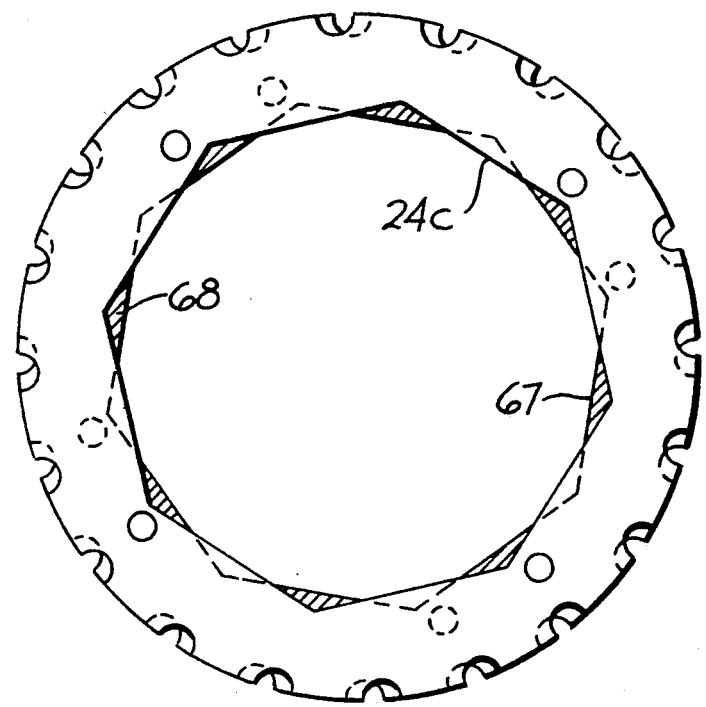

In FIGS. 8 and 9 consider that sprocket wheel 24C is on the shaft with keys in registry and sprocket wheel 67 is rotated in the indentation so that the keys are misaligned and the wheel 67 is axially retained. The indentation may be wide enough to permit a desired degree of axial movement, if desired, but serves the purpose of confining axial mobility of sprocket wheel 67. In FIG. 9, the segments 68 of sprocket wheel 67 are shaded to emphasize the rotational mis-alignment of the keys. The offset angle of the keys in sprocket wheels 24C and 67 is preferably 22.5 degrees when an octagonal shaft surface key is employed. Note that the sprocket wheels 24C and 67 are not identical because the apertures 70, 71 are offset differently relative to the key configurations in the respective wheels.

A coupling yoke member, such as rod 68 (preferably with at least one other, not shown), is coupled between sprocket wheels 24C and 67 at the respective apertures 70, 71 to prevent rotation of sprocket wheel 67 while it is retained in its axially locked in posture, since sprocket wheel 24C is non-rotationally keyed to the shaft (60). The particular sprocket wheel 24C may be held in an axially fixed relationship by the coupling member 68, or alternatively may axially slide along it to float. Any other sprocket wheels are free to float and need not ride on the coupling member 68.

Having therefore advanced the state of the art with improved sprocket drive systems for modular conveyor belts, and self contained sprocket drive modules those novel features setting forth the spirit and nature of the invention are defined with particularity in the following claims.

I claim:

1. A modular conveyor belt sprocket drive unit for modular conveyor belt systems with a modular link belt of predetermined width adapted for engaging sprocket drive means distributed in a predetermined pattern across the belt width, comprising in combination:

a rotary drive shaft disposed along an axis to be oriented across said conveyor belt width, a set of laminar sprocket wheels keyed to said shaft for rotation therewith variably positionable at selected positions along the shaft, all floatable on the shaft to move axially along the shaft in response to dynamic conditions encountered in driving the belt, and tracking means axially positioned at an unkeyed sprocket wheel station along the shaft for permitting a limited degree of wander of the belt away from a preferred path.

2. The modular unit of claim 1 wherein the tracking means further comprises a sprocket wheel held in a groove wider than the sprocket wheel positioned at a predetermined axial position along the shaft.

3. The modular unit of claim 2 further comprising a circumferential indentation about said shaft of an axial width greater than the sprocket wheel holding said sprocket wheel from wandering.

4. A modular conveyor belt sprocket drive unit for modular conveyor belt systems with a modular link belt of predetermined width adapted for engaging sprocket drive means distributed in a predetermined pattern across the belt width, comprising in combination:

a rotary drive shaft disposed along an axis to be oriented across said conveyor belt width, a set of sprocket wheels carried by said shaft for rotation therewith variably positionable at selected positions along the shaft and floatable on the shaft to move axially along the shaft in response to dynamic conditions encountered in driving the belt, tracking means axially positioned at a station along the shaft for controlling wander of the belt away from a preferred path, keying structure comprising a set of axial indentations on the shaft and apertures in said sprocket wheels or mating shape to key the sprocket wheels on the shaft for rotation therewith, and wherein said tracking means further comprises a circumferential indentation in the shaft surface configuration for receiving a sprocket wheel in a configuration relatively rotatably with respect to the shaft.

5. The modular unit of claim 4 further comprising a tracking sprocket wheel mated in said circumferential indentation and rotated therein for orientation of the aperture with respect to the axial indentations at a position for retaining the tracking sprocket wheel axially in place.

6. The modular unit of claim 5 further comprising a link between said tracking sprocket wheel and a further sprocket wheel for unrotatably holding the tracking sprocket wheel in said circumferential indentation non-rotatably with respect to said shaft.

7. The modular unit of claim 6 wherein said circumferential indentation is wide enough to permit a predetermined amount of axial movement along said shaft.

8. The modular unit of claim 4 wherein said sprocket wheels are confined to rotate with said shaft by means of keying structure disposed on the surface of the shaft to engage mating keying structure of a sprocket wheel, and said tracking means further comprises a gap in the keying structure for permitting a tracking sprocket wheel to rotate on the shaft into a position restricting axial movement of the sprocket wheel along the shaft.

9. The modular unit of claim 8 further comprising confining means for retaining the tracking sprocket wheel in the gap at a position confining axial movement of the tracking sprocket wheel along the shaft.

10. In a modular link belt conveyor system, a belt drive system comprising in combination: a drive shaft, a set of sprocket wheels, keying structure axially disposed substantially along the shaft except for a gap in a mid-shaft location and mating structure in said sprocket wheels for retaining said sprocket wheels on said shaft to rotate therewith with a freedom of axial movement along the shaft, and belt tracking means for holding one of the sprocket wheels on the shaft in a restricted degree of axial movement in said gap in said keying structure.

* * * * *